United States Patent [19]

Herr et al.

[11] 4,063,123
[45] Dec. 13, 1977

[54] ROTOR WINDING IMPROVEMENT

[75] Inventors: John Addison Herr, Garwood; Wolfgang Jaffe, Roselle Park, both of N.J.

[73] Assignee: The Singer Company, New York, N.Y.

[21] Appl. No.: 590,246

[22] Filed: June 25, 1975

Related U.S. Application Data

[63] Continuation-in-part of Ser. No. 453,738, March 22, 1974, abandoned.

[51] Int. Cl.² ............................................. H02K 3/46
[52] U.S. Cl. ..................................... 310/270; 310/233
[58] Field of Search .................. 310/192, 71, 193, 85, 310/91, 194, 214, 40 MM, 208, 261, 262, 263, 264, 270, 271, 211, 66, 233, 265, 234, 237, 236, 231; 336/197

[56] References Cited

U.S. PATENT DOCUMENTS

| 277,644 | 5/1883 | Weston | 310/265 |
|---|---|---|---|
| 854,760 | 5/1907 | Reist | 310/211 |
| 995,469 | 6/1911 | Knight | 310/211 |
| 2,815,461 | 12/1957 | Jernberg | 310/211 |
| 2,998,537 | 8/1961 | Zeissler | 310/270 |
| 3,014,146 | 12/1961 | Andres | 310/270 |
| 3,244,917 | 4/1966 | Gute | 310/237 |

FOREIGN PATENT DOCUMENTS 446,507 11/1967 Switzerland ....................... 310/261

Primary Examiner—R. Skudy
Attorney, Agent, or Firm—Edward L. Bell; Robert E. Smith; Edward P. Schmidt

[57] ABSTRACT

A rotor which utilizes winding guide discs to enable the slots of any rotor to be completely filled with wire without thereby increasing the diameter of the rotor by bulging out of the end windings. Winding guide discs having substantially the same cross section as the rotor are spaced a sufficient distance from the ends of the rotor to contain that portion of the end windings which will fill the space between the outside diameter of the rotor shaft and the minimum radial dimension of the slots in the rotor. After this space is filled, further end windings are wound from the rotor slots about corresponding apertures in the winding guide discs within the corresponding space on the disc. In the event that this corresponding space is filled further winding guide discs may be used as required to prevent the bulging of the end windings sought to be avoided. In a preferred construction the rotor core may be eliminated and the winding may be accommodated on winding guide discs; spaced by a stepped shaft, or by an insulated sleeve providing double insulation. Additional winding guide discs may be used, as required, to accommodate the end windings without bulging. The rotor assembly thus constructed may be potted or molded in plastic to provide support for the windings against centrifugal force.

12 Claims, 9 Drawing Figures

ROTOR WINDING IMPROVEMENT

CROSS REFERENCE TO RELATED APPLICATIONS

This application is a continuation in part of the prior Patent application Ser. No. 453,738 filed on Mar. 22, 1974, now abandoned.

BACKGROUND OF THE INVENTION

The new rare earth magnets used in electrical equipment exhibit such stability and strength that more copper can be used in the windings of the rotor to create a more efficient and powerful electromechanical device. A problem, particularly encountered in small diameter rotors, is the inability to completely fill the rotor slots with wire or to utilize larger rotor slots inasmuch as too much wire in the end windings extending from one slot to another protrude over and partially occlude the intervening slots which would, on winding the intervening slots, create a bulge over the profile diameter of the rotor. The result is a restraint on optimizing the design, requiring the use of less wire or requiring an increase in rotor size or an abnormal clearance between the rotor and the stator.

BRIEF SUMMARY OF THE INVENTION

It is an object of this invention to remove the above noted restraint by allowing the maximum amount of wire to be used in the smallest practical rotor size commensurate with the least clearance between the rotor and the stator.

This desirable end is achieved by providing additional supports for the end windings of the rotor. the additional supports are designed to prevent an excess pile up of end winding over any of the slots which would cause subsequent winding of the slots thus partially occluded to bulge over the rotor profile in the end winding area. The additional supports are spaced from the end of the rotor a sufficient distance to accommodate that portion of the end windings which would not protrude over any of the slots, the remaining portion of the end windings being extended to pass over the additional supports. These additional supports, called winding guide discs, have substantially the same cross section as the rotor with apertures aligned with the rotor slots. End winding in excess of that which would partially occlude a rotor slot is extended through the corresponding apertures in the winding guide discs. In the event that sufficient end windings remain to partially occlude the apertures in the winding guide disc, additional winding guide discs may be used to obviate this possibility, as required.

In a preferred construction, the rotor core may be eliminated, to be replaced by winding guide discs and means spacing the discs a distance apart equivalent to the length of a rotor core. In the preferred construction the winding guide discs are constructed with extra large apertures to compensate for the partial occlusion which will take place when end windings cross over intervening slots. Additional winding guide discs may be used as necessary to prevent undesirable bulging of end winding over the outside diameter of the rotor.

DESCRIPTION OF THE DRAWINGS

In FIG. 1 is shown a preferred embodiment of a rotor 10 completely wound in accordance with the invention as will be disclosed below. The rotor 10 includes a shaft 11 which supports a non-ferrous and preferably plastic rotor core 12, a pair of non-ferrous and preferably plastic winding guide discs 13, a commutator 14 and wire 15. The wire 15 is carried in slots 17-23 in the rotor core 12 (See FIGS. 2 and 4) and progresses from one slot to another over the end of the rotor core and winding guide discs 13 in end windings 25.

Figure 1:
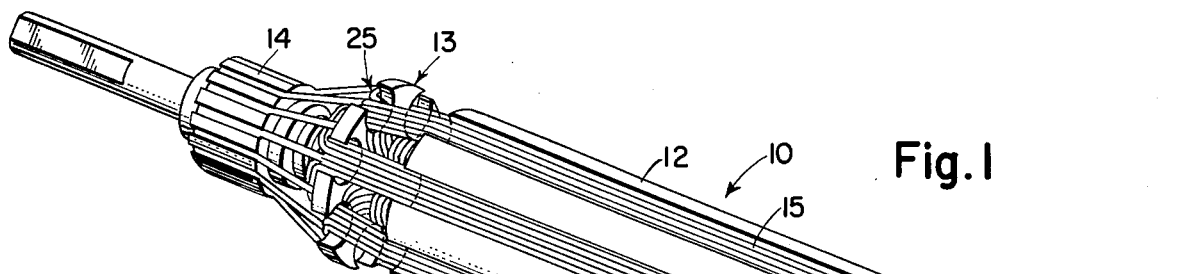
FIG. 1 is a perspective view of a completed rotor wound in accordance with the teachings of this invention to enable the complete filling of the rotor slots with wire.
Figure 2:
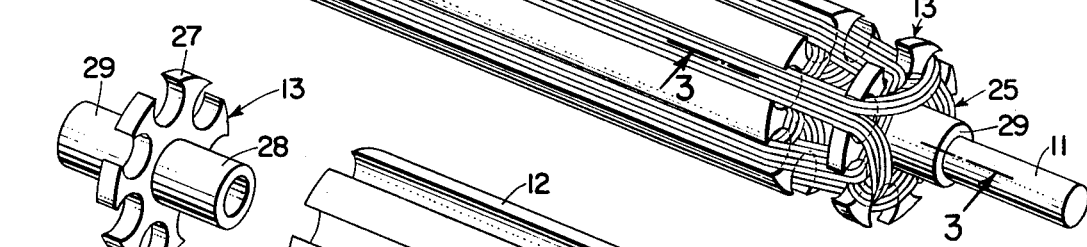
FIG. 2 is an exploded perspective view of some of the component parts of the rotor shown in FIG. 1.

The winding guide disc 13 consists of a disc portion 27 having substantially the same cross section as the rotor core 12. An integral sleeve 28 on one side of the winding guide disc 13 serves to space the disc portion 27 from the rotor core 12 a sufficient distance to allow passage of a portion of the end windings 25, and also provide double insulation of the wire from the shaft 11. An identical sleeve 29 on the side of the disc portion 27 opposite that of the sleeve 28 provides double insulation for the remaining portion of the end windings 25. As noted above, the disc portion has substantially the same cross section as the rotor core 12 and therefore has apertures 37-43 corresponding to the slots 17-23 in the rotor core 12. As will be explained below, only a portion of the end windings pass through the apertures in the winding guide discs 13, and therefore, the apertures 37-43 are not required to be identical to the slots but might be made shallower although they may be manufactured identical in shape as shown in the drawings.

A typical end winding arrangement for the rotor 10 depicted would be as follows (See FIG. 4):

1 Bundle of Windings progressing from slot 17 to slot 20
1 Bundle of Windings progressing from slot 17 to slot 21
1 Bundle of Windings progressing from slot 18 to slot 21
1 Bundle of Windings progressing from slot 18 to slot 22
1 Bundle of Windings proressing from slot 19 to slot 22
1 Bundle of Windings progressing from slot 19 to slot 23
1 Bundle of Windings progressing from slot 20 to slot 23
1 Bundle of Windings progressing from slot 20 to slot 17
1 Bundle of Windings progressing from slot 21 to slot 17
1 Bundle of Windings progressing from slot 21 to slot 18
1 Bundle of Windings progressing from slot 22 to slot 18
1 Bundle of Windings progressing from slot 22 to slot 19

1 Bundle of Windings progressing from slot 23 to slot 19
1 Bundle of Windings progressing from slot 23 to slot 20

Figure 4:
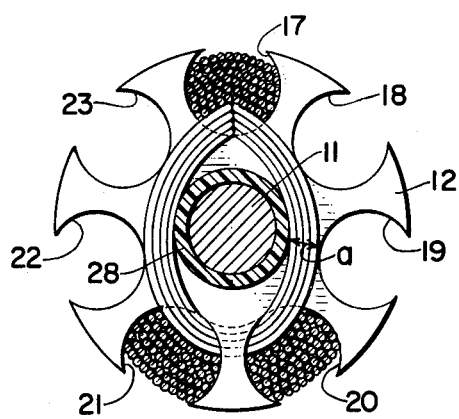
FIG. 4 is a transverse cross sectional view of the end winding taken substantially along line 4—4 in FIG. 3 with, however, only a portion of the windings between three slots being shown for which the end windings do not occulude the intervening rotor slots.
Figure 5:
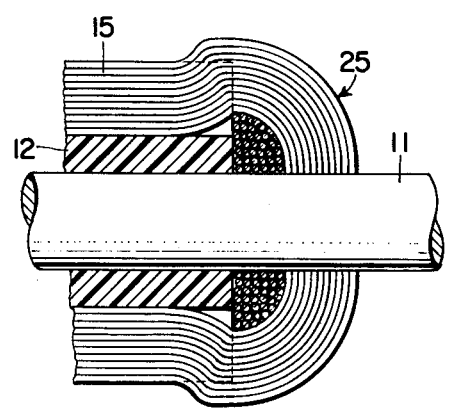
FIG. 5 is a cross sectional view similar to FIG. 3 but showing the same rotor as it would appear if wound using prior art technology.

FIG. 4 shows for the sake of simplicity a partially wound rotor section showing the rotor core 12 and sleeve 28 of the winding guide disc 13 but without the disc portion 27. Thus the wire bundles progressing from slot 17 to slots 20 and 21 pass about both sides of the sleeve 28 for the shortest possible route between the slots. It is apparent from the above table that the wires filling slot 17, or any other slot for that matter, are in four separate but equal size bundles. Note that two bundles progress from slot 17 to slots 20 and 21, and, that one bundle progresses from slot 20 to slot 17 and one bundle from slot 21 to slot 17. It can be shown that for the slot configuration shown in FIG. 4 between the minimum radial dimension of each slot and the outside diameter of the sleeve 28, i.e. that span "a" in FIG. 4, four bundles of wire or the entire capacity of one of the slots must pass without intrusion into the slot area. For example, note from the table that slot 18 is bypassed by a bundle of windings from the following slots:

from slot 17 to slot 20
from slot 20 to slot 17
from slot 23 to slot 19
from slot 19 to slot 23, for a total of four bundles or an amount sufficient to fill one entire slot. In addition, slot 18 has four bundles of wires which pass between it and slots 21 and 22. Using the prior art technology, where the amount of wire used is maximized and the rotor diameter is insufficient compared to the size of slot required to contain the wire, a situation as depicted in FIG. 5 results with partial occlusion of the slot by those wires bypassing the slot, resulting in a bulge over the outside diameter of the rotor by the wires passing from the slot over those wires bypassing the slot.

Figure 3:
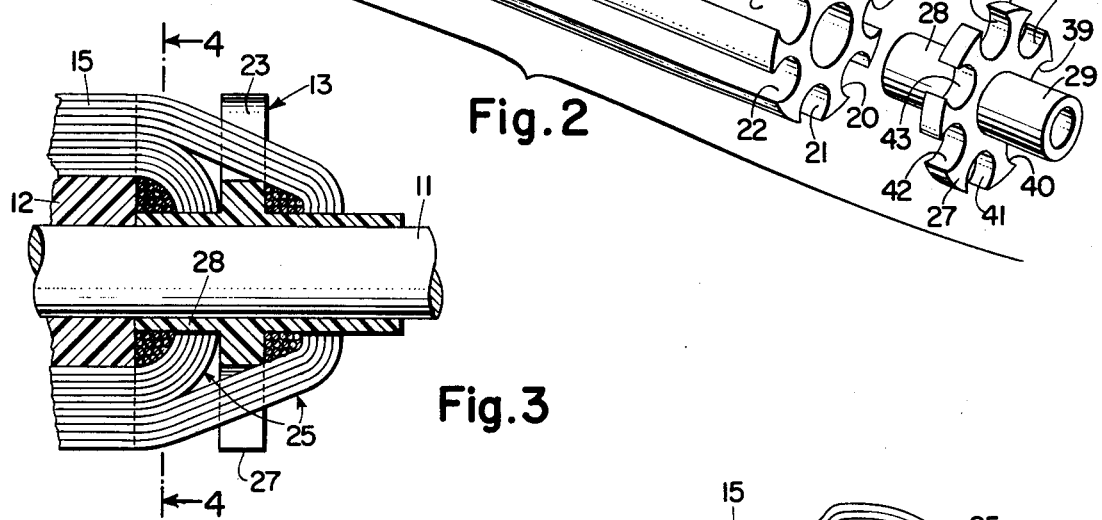
FIG. 3 is a cross sectional view of the end windings taken along the axis of the rotor substantially along the line 3—3 of FIG. 1.

In FIG. 3 is shown a cross section of the rotor end windings 25 when a winding guide disc 13 is utilized. In winding the armature, only that amount of wire passing from one slot to another which would fill the span "a" (See FIG. 4) of the intervening slots is wound adjacent the rotor core, the remaining portion of the wire is then wound about a winding guide disc 13. In this way the partial occlusion of the intervening slots is obviated by providing additional space for the pile up of end windings. In the event that still more space is required a second winding guide disc may be used, this second disc not requiring the sleeve 28 however since it may abut the sleeve 29 on the first winding guide disc. Winding guide discs of this sort may be added in the quantities necessary to provide the space required for the end windings.

It should be noted that the sleeves 28 and 29 of the winding guide disc 13 are not absolutely essential for this invention. The sleeves perform the dual purpose of spacing the winding guide disc portion 27 from the rotor core and of providing additional or double insulation of the windings from the steel shaft. The sleeves may be dispensed with and the disc portion 27 may be located by other means such as adhesives, or a shoulder on the shaft 11.

The rotor core 12 when manufactured from a plastic material provides low inertia as well as double insulation. It is evident that the rotor may be constructed from any material desired without effecting the utility of the winding guide discs. It is further evident that although a specific winding scheme has been shown for use in seven rotor slots, a similar problem would exist and this invention will find utility with other rotors attempting to utilize the maximum amount of windings, particularly as the rotor diameter is decreased. In a rotor with seven slots, approximately as shown in the drawings, the amount of wire passing through each slot was increased from 240 to 300 turns by the utilization of winding guide discs, thereby substantially increasing the strength and efficiency of a small diameter motor using rare earth magnets in the stator.

Figure 6:
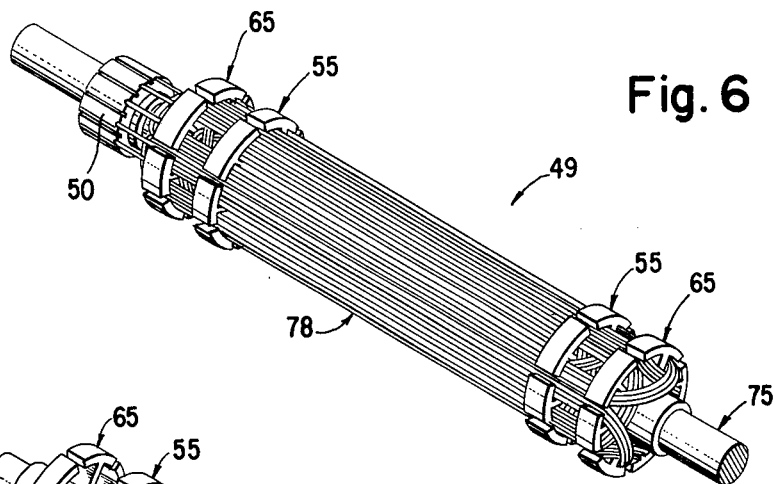
FIG. 6 is an assembled perspective of a modified rotor assembly before potting.
Figure 7:
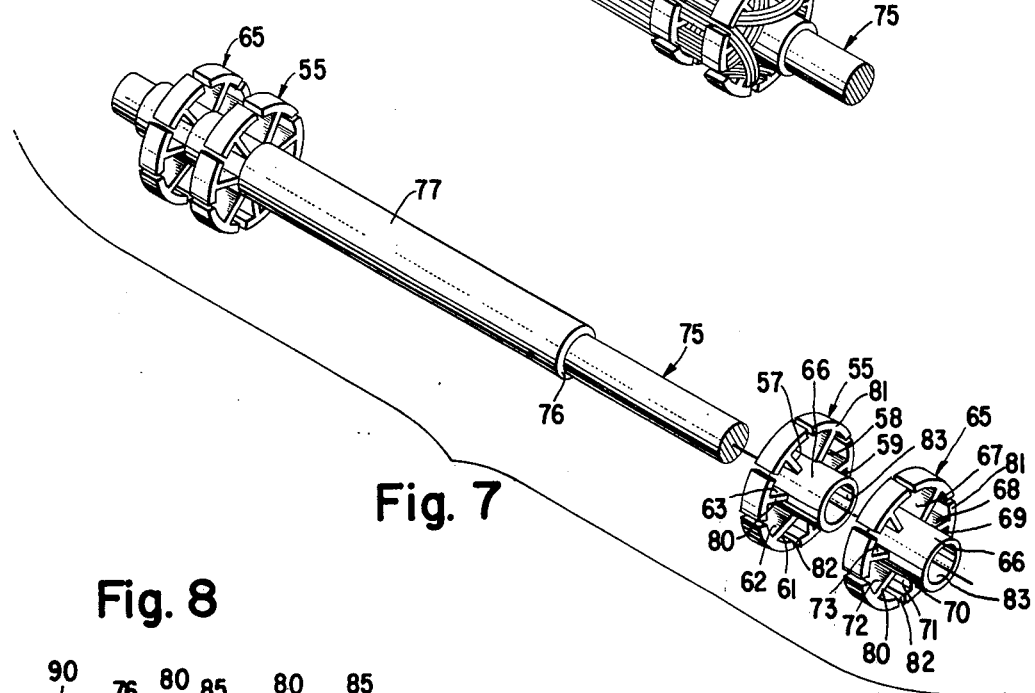
FIG. 7 is a partially disassembled perspective of the rotor of FIG. 6 without the windings showing details of construction.
Figure 8:
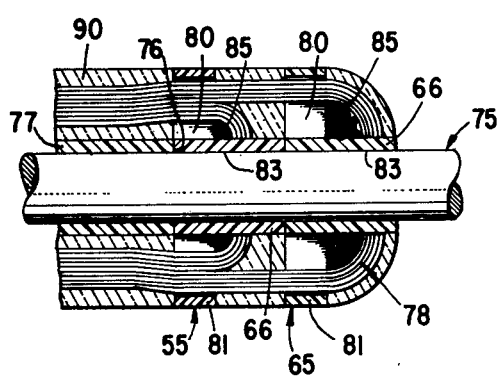
FIG. 8 is a cross section of a part of the modified rotor assembly of FIG. 6 indicating the winding and potting.

A modified rotor assembly 49 is shown in FIGS. 6, 7 and 8; which eliminates the rotor core 12 and utilizes a form of winding guide discs 55, 65 characterized primarily by large apertures 57-63 and 67-73. The discs 55 and 65 may have different form, but for manufacturing simplicity are made identical.

Referring to FIG. 7, the discs 55, 65 are mounted on shaft 75, which may be machined with a step 76 on both ends thereof to space the innermost discs 55 a suitable distance apart to form the required winding 78 of the assembled rotor 49. The windings 78 are connected to commutator 50 of rotor assembly 49 in the usual fashion. It is readily apparent that as second step (not shown) may be provided on both ends of the shaft 75 to permit the discs 65 to be spaced a suitable distance from the innermost discs 55. A preferred method, however, is to have the shoulder 76 formed by an insulating sleeve 77 for spacing the innermost discs 55, and to have the discs 55 and 65 made identical, with integral separate insulating sleeves 66 for self spacing and to provide double insulation for the winding wire 78 from the shaft 75 as in the rotor shaft shown in FIGS. 1-5.

As will be apparent from FIG. 8, the winding guide discs 55 on both ends of the insulating sleeve 77 replace the rotor core 12 for guiding the windings 78. The winding table presented for the rotor of FIG. 1 may be applied to the rotor of FIG. 6 with numbers 57-63 replacing the numbers 17-23. In the case of the modified rotor assembly 49, however, there is no minimum radial dimension "a" as shown in FIG. 4. Thus, as seen in FIG. 8, after the first windings from 57 to 60 and 57 to 61 is completed, the windings from 58 to 61 and 58 to 62 pass over bundles of wires which partially occlude the apertures 57 to 60 and 61. The partial occlusion of the intervening apertures is more than compensated for by the large size of the apertures 57-63 and 67-73.

Figure 9:
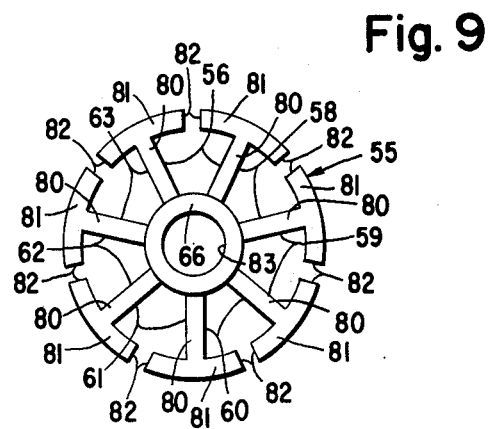
FIG. 9 is an elevation of the winding guide disc used in the rotor of FIGS. 6-8.

Referring to FIG. 9, the apertures 57-63 (and 67-73) are formed in the winding guide discs 55 (and 65) by radial arms 80. The arms 80 are topped by caps 81, which form a cylinder about the arms 80 having slots 82 through which winding may be achieved. The winding guide discs 55 are formed with a hole 83 for receiving the shaft 75. It is apparent that the cross end windings 85 on discs 55 and 65, visible in FIG. 8, are located on the insulating sleeves 66 adjacent that part of the apertures 57-63 where they will have the least occluding effect on the apertures. It is also apparent from FIG. 9 that the area of apertures 57-63 is so large compared to the area of apertures 17-23 of the rotor of FIGS. 1-5, that it is entirely possible to have more area available in the apertures 57-63 than in the apertures 17-23 even after the apertures 57-63 are partially occluded. This may be achieved by judicious selection of the number of bundles from the winding guide table which form end windings about disc 55 and the number which progress to corresponding apertures 67-73 in disc 65. Thus, for example, of the 14 bundles in the winding table, 6 may pass about disc 55 and 8 may extend further to pass about disc 65.

In order to lend support to the windings 78 on the modified rotor assembly 49, the entire rotor assembly may be potted, by any conventional method, in a clear plastic resin 90 or similar substance. Besides providing support for the windings 78 against centrifugal force, such a technique may also discourage independent movement of the various component parts of the rotor.

Having thus set forth the nature of the invention what we claim is:

1. A rotor for an electromechanical device including a cylindrical core formed with lengthwise exterior slots, said slots having a least radial dimension, electrically conductive wire wound in said slots, said electrically conductive wire forming end windings at the ends of said cylindrical core by progressing from one slot to another slot separated therefrom by at least one intervening slot, at least one winding guide disc arranged in axially spaced relation beyond each of the ends of said cylindrical core, each of said discs having substantially the same circular dimensions as said cylindrical core and having a plurality of circumferentially open apertures equal in number and substantially aligned with said slots, a portion of said end windings being accommodated in the space between said cylindrical core and said winding guide discs up to no more than said least radial dimension of said slots, a remaining portion of said end windings being accommodated at the opposite end of said winding guide discs from said cylindrical core by passing from one aperture aligned with said one slot to another aperture aligned with said another slot, said one aperture being separated from said another aperture by at least one intervening aperture aligned with said intervening slot, whereby said end windings by being axially distributed beyond said cylindrical core by said winding guide discs are accommodated within the circular dimension of said core.

2. A rotor for an electromechanical device including a substantially cylindrical member having a plurality of slots extending lengthwise along the periphery of said cylinder, said slots having a least radial dimension; a supporting shaft extending axially of said cylindrical member; electrically conductive material wound in said slots in a manner suitable for use in said electromechanical device, said electrically conductive material forming end windings by progressing from one slot to another slot separated therefrom by at least one intervening slot; and means supported by said shaft for establishing electrical connection with said electrically conductive material; wherein the improvement comprises at least one winding guide disc at each end of said cylindrical member, each of said discs having substantially the same circular dimensions as said cylindrical member, and having a plurality of circumferentially open apertures equal in number and substantially aligned with said slots, said apertures having a smallest radial dimension, means spacing said winding guide discs from said member for receiving therebetween some portion of said end windings up to no more than said least radial dimension of said slots, a second portion of said end windings being received as end windings between said discs up to no more than said smallest radial dimension of said discs by passing through one aperture aligned with said one slot to another aperture aligned with said another slot, said one aperture and said another aperture being separated by at least one intervening aperture aligned with said at least one intervening slot, a final portion of said end windings being accommodated as end windings at the opposite end of said winding guide disc furthest from said cylindrical member, whereby said end windings by being axially distributed beyond said cylindrical core by said winding guide disc are accommodated within the circular dimension of said core.

3. A rotor as claimed in claim 2 wherein said means spacing said winding guide disc from said ends of said member includes a sleeve integral with said winding guide disc.

4. A rotor as claimed in claim 3 wherein said circular member and said winding guide discs are fashioned from a substantially electrically non conductive material, and said winding guide disc includes a second integral sleeve opposite said spacing sleeve whereby said electrically conductive material is doubly insulated from said supporting shaft.

5. A rotor for an electromechanical device including a cylindrical core formed with lengthwise exterior slots, said slots having a least radial dimension, electrically conductive wire accommodated in said slots and forming end windings at the ends of said cylindrical core by progressing from one slot to another slot separated therefrom by at least one intervening slot, a commutator spaced from said core providing electrically conductive connection to said electrically conductive wire, at least one winding guide disc arranged in axially spaced relation beyond each of the ends of said cylindrical core, each of said discs having substantially the same circular dimensions as said cylindrical core, and having a plurality of circumferentially open apertures equal in number and substantially aligned with said slots, a portion of said end windings being accommodated as end windings in the space between said cylindrical core and said winding guide disc up to no more than said least radial dimension, a remaining portion of said end windings being accommodated as end windings at the opposite end of said winding guide discs from said cylindrical core by passing through one aperture aligned with said one slot to another aperture aligned with said another slot, said one aperture and said another aperture being separated by at least one intervening aperture aligned with said at least one intervening slot, whereby said end windings by being axially distributed beyond said cylindrical core by said winding guide discs are accommodated within the circular dimension of said core.

6. A rotor for an electromechanical device including a substantially cylindrical member having a plurality of slots extending lengthwise along the periphery of said cylinder, said slots having a least radial dimension; a supporting shaft extending axially of said cylindrical member; electrically conductive material wound in said slots in a manner suitable for use in said electricalmechanical device, said electrically conductive material forming end windings by progressing from one slot to another slot separted therefrom by at least one intervening slot; and a commutator supported on said shaft spaced from said member and providing electrically conductive connection to said electrically conductive wire; wherein the improvement comprises at least one winding guide disc at each end of said cylindrical member, each of said discs having substantially the same circular dimensions as said cylindrical member and having a plurality of circumferentially open apertures equal in number and substantially aligned with said slots, said apertures having a smallest radial dimension, means spacing said winding guide discs from said member for receiving therebetween a first portion of said end windings up to no more than said least radial dimension of said slots, a second portion of said end windings being received as end windings between said discs up to no more than said smallest radial dimension of said discs by passing through one aperture aligned with said one slot to another aperture aligned with said another slot, said one aperture and said another aperture being separated by at least one intervening aperture aligned with said intervening slot, a final portion of said end windings being accommodated at the opposite end of said winding guide disc furthest from said cylindrical member, whereby said end windings by being axially distributed beyond said cylindrical member by said winding guide discs are accommodated within the circular dimension of said core.

7. A rotor for an electromechanical device, said rotor comprising:
   a supporting shaft;
   a first and a second substantially circular winding guide disc supported by said supporting shaft, each of said discs being formed with a plurality of radial apertures;
   means spacing said first of said discs from said second of said discs on said shaft;
   electrically conductive wire wound from said radial apertures on said first disc to said radial apertures on said second disc spanning said space, said wire progressing from one radial aperture to another radial aperture on each of said discs opposite said space in the formation of end windings.

8. A rotor for an electromechanical device, said rotor comprising:
   a supporting shaft;
   a first and second plurality of substantially circular winding guide discs supported by said supporting shaft, each of said discs being formed with a plurality of radial apertures;
   means spacing said first plurality of discs from said second plurality of discs on said shaft;
   means separating said discs within said first and second pluralities from each other;
   electrically conductive wire wound in said radial apertures of discs in said first and second plurality of discs closest to each other spanning said space, a portion of said wire progressing from one radial aperture to another radial aperture on said discs closest to each other on the sides of the discs away from said space in the formation of end windings, said end windings being accommodated in the separation between said closest discs and next closest discs in the first and second plurality of discs, a remaining portion of said wire passing through corresponding radial apertures in the next closest discs to be accommodated as end windings in the separation between discs in said first and second plurality of discs.

9. A rotor as claimed in claim 8 wherein said means separating said discs within said first and second pluralities from each other includes a sleeve integral with said winding guide disc.

10. A rotor as claimed in claim 9 wherein said means spacing said first plurality of discs from said second plurality of discs on said shaft includes a sleeve supported by said shaft.

11. A rotor as claimed in claim 10 wherein said separating means and said spacing means are fashioned from a substantially electrically non conductive material whereby said electrically conductive wire is doubly insulated from said supporting shaft.

12. A rotor as claimed in claim 8 wherein said first and second plurality of substantially circular winding guide discs, said spacing means, said separating means and said electrically conductive wire are encased in an electrically non conductive material.

* * * * *